United States Patent
Gaither et al.

(10) Patent No.: US 10,059,330 B2
(45) Date of Patent: Aug. 28, 2018

(54) DRAFTING DETECTION AND VEHICLE OPERATION OPTIMIZATION SYSTEM

(71) Applicant: Toyota Motor Engineering & Manufacturing North America, Inc., Erlanger, KY (US)

(72) Inventors: Geoffrey D. Gaither, Brighton, MI (US); Takanori Aoki, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 56 days.

(21) Appl. No.: 15/273,571

(22) Filed: Sep. 22, 2016

(65) Prior Publication Data

US 2018/0079405 A1 Mar. 22, 2018

(51) Int. Cl.

| | |
|---|---|
| *B60W 30/18* | (2012.01) |
| *B60W 30/02* | (2012.01) |
| *B60W 30/188* | (2012.01) |
| *B60W 20/15* | (2016.01) |
| *B62D 37/02* | (2006.01) |
| *F02D 41/00* | (2006.01) |
| *B60K 11/08* | (2006.01) |

(52) U.S. Cl.
CPC ........... *B60W 30/02* (2013.01); *B60K 11/085* (2013.01); *B60W 20/15* (2016.01); *B60W 30/188* (2013.01); *B60W 30/18009* (2013.01); *B62D 37/02* (2013.01); *F02D 41/0047* (2013.01); *B60W 2540/10* (2013.01); *B60W 2550/30* (2013.01)

(58) Field of Classification Search
CPC . B60W 30/18009; B60W 20/15; B60W 20/16
USPC ............................................... 701/36
See application file for complete search history.

(56) References Cited

U.S. PATENT DOCUMENTS

| | | |
|---|---|---|
| 5,546,799 A | 8/1996 | Parker |
| 7,404,784 B2 | 7/2008 | De Mersseman |
| 7,437,232 B2 | 10/2008 | Tengler et al. |
| 7,460,946 B2 | 12/2008 | Shima |
| 7,565,233 B2 | 7/2009 | Logdberg |

(Continued)

FOREIGN PATENT DOCUMENTS

JP 10166894 6/1998

*Primary Examiner* — Nadeem Odeh
(74) *Attorney, Agent, or Firm* — Snell & Wilmer LLP

(57) ABSTRACT

A system for improving performance or efficiency of operation of a vehicle. The system includes a sensor configured to detect current vehicle speed data and current vehicle slope data. The system includes a pedal control unit configured to detect current pedal position data. The system includes an electronic control unit (ECU) configured to determine expected driving power demand based on current vehicle speed data and vehicle slope data. The ECU is configured to determine detected driving power demand based on current pedal position data. The ECU is configured to detect a drafting condition when the expected driving power demand exceeds the detected driving power demand. The ECU is configured to adjust, when the drafting condition is detected, at least one of a chassis control setting, an engine control setting, a transmission control setting, or a hybrid control setting to improve performance or efficiency of operation of the vehicle.

20 Claims, 10 Drawing Sheets

(56) References Cited

U.S. PATENT DOCUMENTS

| | | |
|---|---|---|
| 8,014,928 B2 | 9/2011 | Mills et al. |
| 8,185,302 B2 | 5/2012 | Schunder |
| 8,352,111 B2 | 1/2013 | Mudalige |
| 8,482,436 B2 | 7/2013 | Bonutti |
| 8,556,013 B2 | 10/2013 | Sturmon et al. |
| 9,145,137 B2 | 9/2015 | Doi et al. |
| 9,182,764 B1 | 11/2015 | Kolhouse et al. |
| 2008/0033624 A1 | 2/2008 | Gronau et al. |
| 2009/0281711 A1* | 11/2009 | Ueno ................ B60L 15/2045 701/104 |
| 2016/0104183 A1 | 4/2016 | Moore et al. |
| 2016/0214611 A1* | 7/2016 | Neaves ........... B60W 30/18072 |

* cited by examiner

DRAFTING DETECTION AND VEHICLE OPERATION OPTIMIZATION SYSTEM

BACKGROUND

1. Field

The present disclosure relates to a system and a method for optimizing performance or efficiency of operation of a vehicle, and more particularly to a system and a method for detecting when the vehicle is in a drafting condition and adjusting one or more vehicle settings based on detecting the drafting condition.

2. Description of the Related Art

When a vehicle, such as an automobile, travels, the vehicle may disrupt airflow around the vehicle. When a second, following vehicle travels in sufficient proximity behind a first, leading vehicle, the second vehicle may benefit from the disruption of airflow caused by the first, leading vehicle. This situation is commonly referred to as drafting or slipstreaming. By traveling in sufficient proximity and benefitting from drafting, the second, following vehicle experiences less drag. The second, following vehicle may be able to use less power to travel at an equivalent speed as a non-drafting vehicle.

While the second, following vehicle inherently benefits from drafting effects, further performance and efficiency improvements may be made when in the drafting condition. Thus, there is a need for a system and a method for detecting when the vehicle is in a drafting condition and adjusting one or more vehicle settings based on detecting the drafting condition.

SUMMARY

What is described is a system for improving performance or efficiency of operation of a vehicle. The system includes a sensor configured to detect current vehicle speed data and current vehicle slope data. The system also includes a pedal control unit configured to detect current pedal position data. The system also includes an electronic control unit (ECU) configured to determine an expected driving power demand based on the current vehicle speed data and the vehicle slope data. The ECU is also configured to determine a detected driving power demand based on the current pedal position data. The ECU is also configured to detect a drafting condition when the expected driving power demand exceeds the detected driving power demand. The ECU is also configured to adjust, when the drafting condition is detected, at least one of a chassis control setting, an engine control setting, a transmission control setting, or a hybrid control setting to improve performance or efficiency of operation of the vehicle.

Also described is a vehicle with improved operation performance or operation efficiency. The vehicle includes a sensor configured to detect current vehicle speed data and current vehicle slope data. The vehicle also includes an electronic control unit (ECU) configured to determine an expected driving power demand based on the current vehicle speed data and the vehicle slope data. The ECU is also configured to determine a current driving power demand. The ECU is also configured to detect a drafting condition when the expected driving power demand exceeds the current driving power demand. The ECU is also configured to adjust, when the drafting condition is detected, at least one of a chassis control setting, an engine control setting, a transmission control setting, or a hybrid control setting to improve performance or efficiency of the vehicle.

Also described is a method for improving performance or efficiency of operation of a vehicle. The method includes detecting, by a sensor, current vehicle speed data and current vehicle slope data. The method also includes detecting, by a pedal control unit, current pedal position data. The method also includes determining, by an electronic control unit (ECU), an expected driving power demand based on the current vehicle speed data and the vehicle slope data. The method also includes determining, by the ECU, a detected driving power demand based on the current pedal position data. The method also includes detecting, by the ECU, a drafting condition when the expected driving power demand exceeds the detected driving power demand by a demand difference percentage threshold for a period of time exceeding a demand difference time threshold. The method also includes adjusting, by the ECU, when the drafting condition is detected, at least one of a chassis control setting, an engine control setting, a transmission control setting, or a hybrid control setting to improve performance or efficiency of operation of the vehicle.

BRIEF DESCRIPTION OF THE DRAWINGS

Other systems, methods, features, and advantages of the invention will be or will become apparent to one of ordinary skill in the art upon examination of the following figures and detailed description. It is intended that all such additional systems, methods, features, and advantages be included within this description, be within the scope of the invention, and be protected by the accompanying claims. Component parts shown in the drawings are not necessarily to scale, and may be exaggerated to better illustrate the important features of the invention. In the drawings, like reference numerals designate like parts throughout the different views, wherein:

DETAILED DESCRIPTION

Figure 1A:
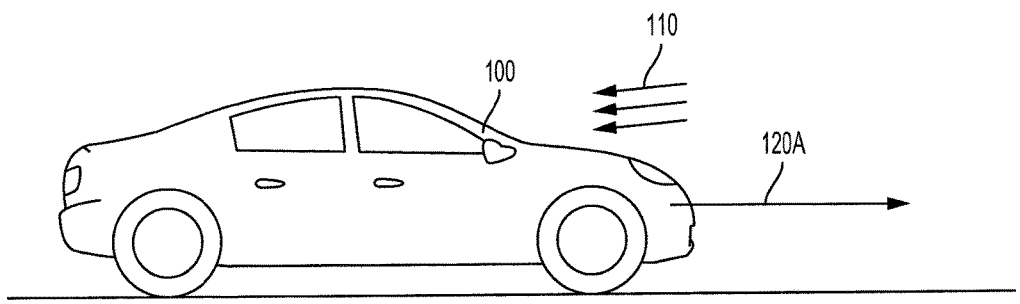
FIG. 1A depicts a vehicle traveling at a vehicle speed, according to an embodiment of the invention.

Disclosed herein are systems and methods for detecting when a vehicle is in a drafting condition and optimizing operation of the vehicle when the drafting condition is detected. Vehicles that are drafting, either intentionally or unintentionally, may experience a benefit of reduced loading, but may not be fully utilizing the drafting condition. The systems and methods of optimizing operation of the vehicle when in the drafting condition provide several benefits and advantages, such as leveraging the reduced driving power demand created by drafting. When in a drafting condition, the vehicle may require less driving power to travel at a particular vehicle speed. Vehicle settings may be adjusted to take advantage of the reduced driving power demand. For example, as less driving power is needed, less engine cooling is needed. Cooling air may be redirected from the engine to other parts of the vehicle, such as a battery or axles. In another example, fuel efficiency of a hybrid vehicle in a drafting condition may be improved by adjusting (e.g., increasing) the threshold when the hybrid vehicle transitions from using the electric motor to the internal combustion engine. The hybrid vehicle may remain in the electric operating mode for a longer period of time, as the drafting condition results in less driving power demand. Increased use of the electric operating mode results in increased fuel efficiency.

In an example embodiment, a vehicle may be traveling a long distance on a freeway, along with several other vehicles. The vehicle may be positioned behind a lead vehicle which disrupts airflow, causing a drafting condition. The vehicle may travel behind the lead vehicle for an extended period of time. During that extended period of time, by recognizing the drafting condition, the vehicle may improve fuel efficiency, emissions, and/or handling of the vehicle. In a situation where multiple vehicles are traveling together, the vehicles may coordinate and form a series of vehicles all in the drafting condition, aside from the lead vehicle. The coordinated vehicles may, in aggregate, experience significant vehicle operation improvements by traveling together, as compared to traveling separately.

An exemplary system includes a sensor configured to detect current vehicle speed data and current vehicle slope data. The system also includes a pedal control unit configured to detect current pedal position data. The system also includes an electronic control unit (ECU) configured to determine an expected driving power demand based on the current vehicle speed data and the vehicle slope data. The ECU is also configured to determine a detected driving power demand based on the current pedal position data. The ECU is also configured to detect a drafting condition when the expected driving power demand exceeds the detected driving power demand. The ECU is also configured to adjust, when the drafting condition is detected, at least one of a chassis control setting, an engine control setting, a transmission control setting, or a hybrid control setting to improve performance or efficiency of the vehicle. In various embodiments, the ECU is configured to adjust, when the drafting condition is detected, two, three or four settings to improve the performance or the efficiency of the vehicle.

FIG. 1A illustrates a vehicle 100. The vehicle may be an electric vehicle, an internal combustion engine vehicle, a hybrid vehicle, a fuel cell vehicle, or any combination thereof. The vehicle may be a vehicle operated by an individual, operated semi-autonomously or fully autonomously, operated remotely, or any combination thereof. As used herein, "driver," "user," or "operator" may refer to a human being driving vehicle 100 when vehicle 100 is a non-autonomous vehicle or operating in a non-autonomous mode. "Driver," "user," or "operator" may also refer to a computing system or a control unit controlling the operation of vehicle 100 when vehicle 100 is a semi-autonomous or fully autonomous vehicle. Also as used herein, "fuel" may refer to gasoline stored in a gasoline tank, electrical energy stored in a battery, fuel stored in a fuel cell, or any combination thereof.

Vehicle 100 may travel at a vehicle speed 120A. As used herein, a single reference number may be used to generally refer to one or more elements having the reference number followed by a letter. For example, vehicle speed 120 may be used when describing either a first vehicle speed 120A or a second vehicle speed 120B, or vehicle speed 120 may also be used to refer to all vehicle speeds 120A-120C collectively.

Figure 1B:
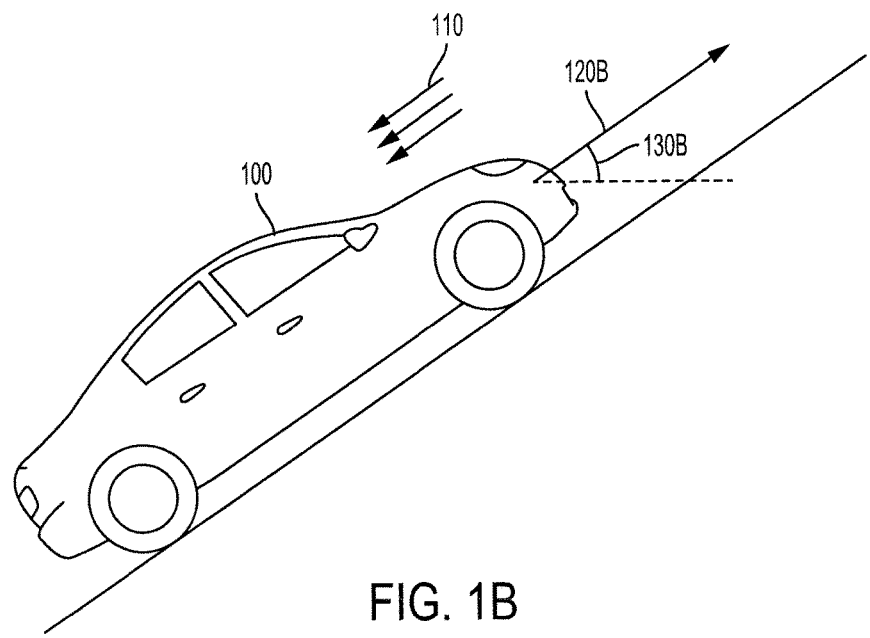
FIG. 1B illustrates the vehicle traveling at a vehicle speed and having a vehicle slope, according to an embodiment of the invention.

FIG. 1B illustrates the vehicle 100 on an angled road. The vehicle 100 may travel at a vehicle speed 120B, and the vehicle 100 may have a vehicle slope of 130B. The vehicle speed 120 and the vehicle slope 130 may be detected by one or more sensors of the vehicle 100, such as an accelerator, a gyroscope, and/or an inertial measurement unit (IMU). As compared to the vehicle slope 130B in FIG. 1B, vehicle 100 in FIG. 1A is traveling on a relatively flat surface, or a surface having relatively no slope.

An amount of engagement of the accelerator pedal is associated with driving power provided by the vehicle. Depending on the vehicle speed 120 and the vehicle slope 130, an amount of engagement of an accelerator pedal by a driver or operator of the vehicle 100 may vary. For example, if vehicle speed 120A and vehicle speed 120B are the same, the accelerator pedal engagement in FIG. 1B is greater than the accelerator pedal engagement in FIG. 1A, as more driving power is needed to travel up the sloped surface in FIG. 1B. The driving power demand in FIG. 1A may be 25 kilowatts and the driving power demand in FIG. 1B may be 35 kilowatts, for example. One or more sensors of vehicle 100 may detect pedal position data indicating the accelerator pedal engagement of vehicle 100.

For a given vehicle speed 120 and a given vehicle slope 130, an expected accelerator pedal engagement of the vehicle 100 may be determined. For example, if vehicle speed 120 is 50 miles per hour and vehicle slope 130 is +3 degrees, an expected accelerator pedal engagement may be 10% engaged. Expected accelerator pedal engagements of different situations may be compared. For example, if vehicle speed 120A and vehicle speed 120B are the same, an expected accelerator pedal engagement of the vehicle 100 in FIG. 1A is less than the expected accelerator pedal engagement of the vehicle 100 in FIG. 1B. As accelerator pedal engagement is directly associated with a driving power demand, the driving power demand is greater in FIG. 1B than in FIG. 1A. Driving power demand may be engine power from an engine and/or motor power from a motor.

While driving, the vehicle 100 is subjected to aerodynamic loading in addition to frictional and inertial loads. An aerodynamic loading 110 is experienced by the vehicle 100. The aerodynamic loading 110 may be characterized by the equation $F=\frac{1}{2} \times C_d \times A \times \rho \times v^2$ where $C_d$ is the coefficient of drag, A is the frontal area, $\rho$ is the air density, and v is vehicle speed.

Figure 1C:
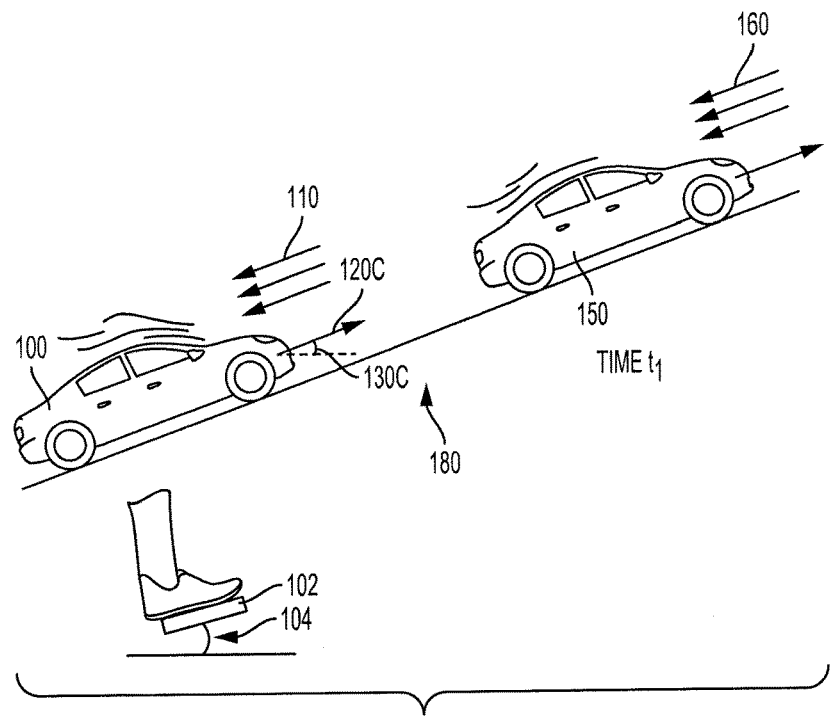
FIG. 1C illustrates the vehicle traveling behind a lead vehicle at a vehicle speed and a vehicle slope and not in a drafting condition, according to an embodiment of the invention.

FIG. 1C illustrates the vehicle 100 traveling behind a lead vehicle 150 at a location 180 and at a time t1. Vehicle 100 experiences an aerodynamic loading 110 and lead vehicle 150 experiences an aerodynamic loading 160. Vehicle 100 is not close enough to lead vehicle 150 to benefit from drafting, as the aerodynamic loading 110 experienced by vehicle 100 is substantially similar to aerodynamic loading vehicle 100 would have experienced even if not following lead vehicle 150, as seen in FIGS. 1A and 1B.

The driver of vehicle 100 engages the accelerator pedal 102 to achieve a first pedal position 104. Given the slope 130C and the vehicle speed 120C, the pedal position 104 is in an expected pedal position, resulting in an expected driving power demand.

Figure 1D:
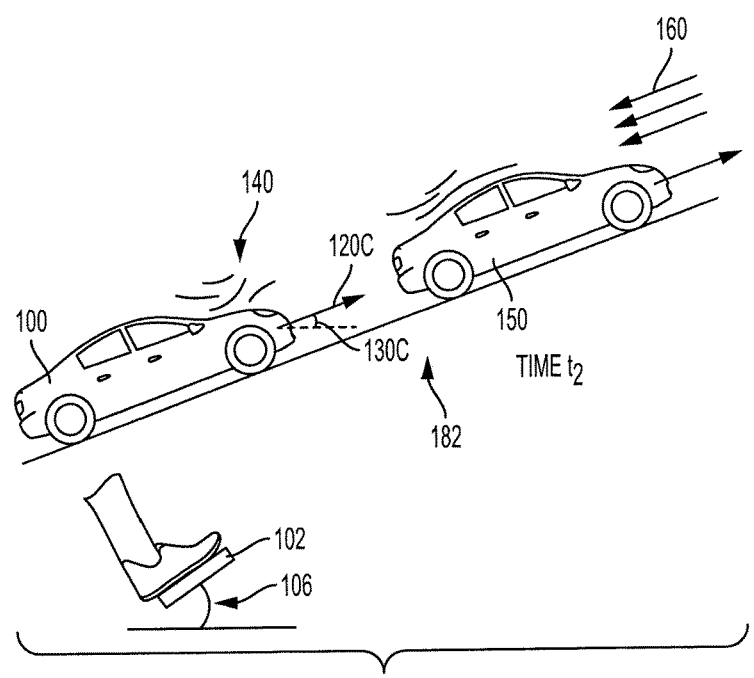
FIG. 1D illustrates the vehicle traveling behind the lead vehicle in a drafting condition, according to an embodiment of the invention.

FIG. 1D illustrates the vehicle 100 traveling behind the lead vehicle 150 at a location 182 and at a time t2. The vehicle speed 120C and the vehicle slope 130C are unchanged from time t1. However, the vehicle 100 is now at a sufficient proximity to the lead vehicle 150 that the vehicle 100 may be in a drafting condition. The aerodynamic loading 140 experienced by the vehicle 100 is now less than the aerodynamic loading 110 when the vehicle 100 was not in the drafting condition (e.g., at time t1 and location 180).

As a result of the reduced aerodynamic loading 140 experienced by the vehicle 100, the pedal position 106 is less than the pedal position 104. That is, when the vehicle 100 is in the drafting condition, the accelerator pedal 102 is less engaged than when the vehicle 100 was not in the drafting condition. Accordingly, the detected driving power demand in the drafting condition is less than an expected driving power demand (e.g., the expected driving power demand in the non-drafting condition). For example, the detected driving power demand in FIG. 1D may be 30 kilowatts, and the expected driving power demand may be 35 kilowatts.

When the vehicle 100 determines that the expected driving power demand exceeds the detected driving power demand, the vehicle 100 may detect a drafting condition. To ensure that the drafting condition is stable, the drafting condition may not be detected unless the expected driving power demand exceeds the detected driving power demand by a predetermined percentage (a "demand difference percentage threshold"). Alternatively, or in addition, the drafting condition may not be detected until the expected driving power demand exceeds the detected driving power demand for a predetermined period of time (a "demand difference time threshold").

Figure 1E:
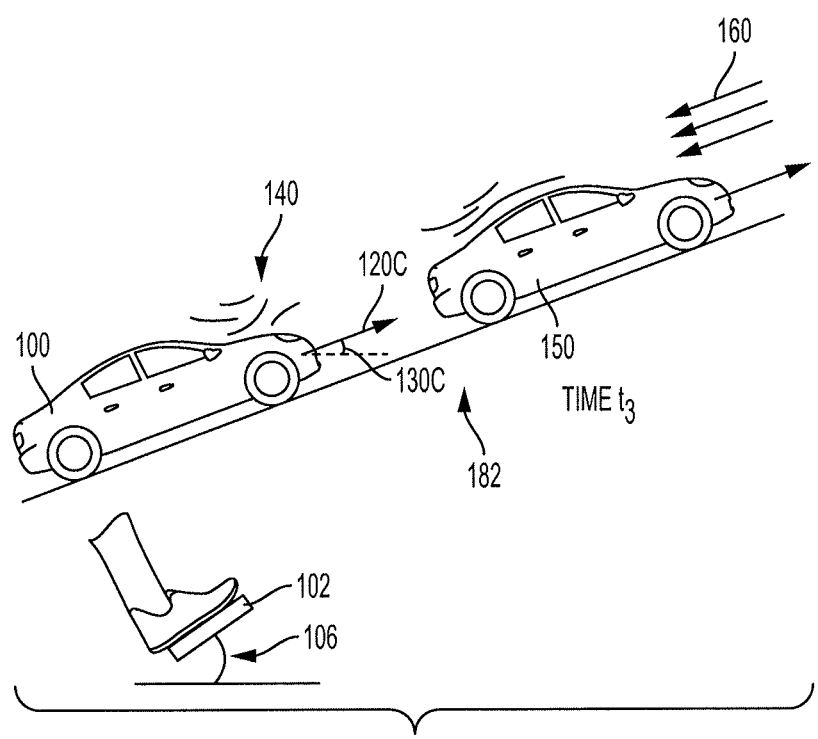
FIG. 1E illustrates the vehicle continuing travel behind the lead vehicle in a drafting condition, according to an embodiment of the invention.

FIG. 1E illustrates vehicle 100 remaining in the drafting condition at a time t3 and at a location 184. The accelerator pedal 102 remains at a pedal position 106, the vehicle slope remains at vehicle slope 130C, and the vehicle speed remains at vehicle speed 120C. As described herein, in order to ensure the drafting condition is stable, the drafting condition may not be detected at least until t3−t2 exceeds the demand difference time threshold.

In some embodiments, the vehicle 100 and the lead vehicle 150 are semi-autonomous or fully autonomous vehicles and are capable of maintaining relative proximity to each other to maintain the drafting condition. Two or more vehicles may form a chain of vehicles all positioned to establish and maintain a series of vehicles in the drafting condition, other than the lead vehicle.

The drafting condition may also be detected when the vehicle speed and the vehicle slope remain constant, but the pedal position is reduced. For example, at time t2, the vehicle speed 120C and the vehicle slope 130C remain constant when compared to the vehicle speed 120C and the vehicle slope 130C at time t1. However, the pedal position 106 at time t2 is reduced when compared to the pedal position 104 at time t1. By detecting the change in pedal position along with constant vehicle speed and vehicle slope, the drafting condition may be detected. As used herein, "constant" vehicle speed and vehicle slope may refer to a no change in vehicle speed and/or vehicle slope, or may also refer to a change in vehicle speed and/or vehicle slope not exceeding 10% of the vehicle speed and/or vehicle slope.

In order to determine whether the drafting condition is stable, the drafting condition may not be detected unless the pedal position change (e.g., pedal position 104 compared to pedal position 106) exceeds a threshold pedal position change. The drafting condition may also not be detected until the pedal position change occurs for a time period exceeding a pedal position change time threshold.

When vehicle 100 is a semi-autonomous or fully autonomous vehicle, pedal position may be replaced with driving power demand, as determined by an electronic control unit (ECU). The ECU may be configured to control the acceleration, braking, and steering of the vehicle 100. Based on an autonomous driving algorithm or protocol, the ECU may drive the vehicle 100 in a particular manner. During the course of its driving of vehicle 100, the ECU may determine a current driving power demand to be applied at a given time, and the ECU may also determine an expected driving power demand at that given time, based on the vehicle speed and vehicle slope. When the expected driving power demand exceeds the current driving power demand, the ECU may detect a drafting condition.

For example, an ECU of the vehicle 100 may determine an expected driving power demand of 35 kilowatts when the vehicle 100 has a vehicle speed 120C and a vehicle slope 130C, as shown in FIG. 1D. The ECU of the vehicle 100 may also determine a current driving power demand of 30 kilowatts based on an autonomous driving algorithm or protocol used to drive the vehicle 100. When the expected driving power demand exceeds the current driving power demand, the ECU may detect a drafting condition. The current driving power demand, used when the vehicle 100 is an autonomous vehicle, may be analogous to the pedal position data, used when the vehicle 100 is a non-autonomous vehicle.

Figure 2A:
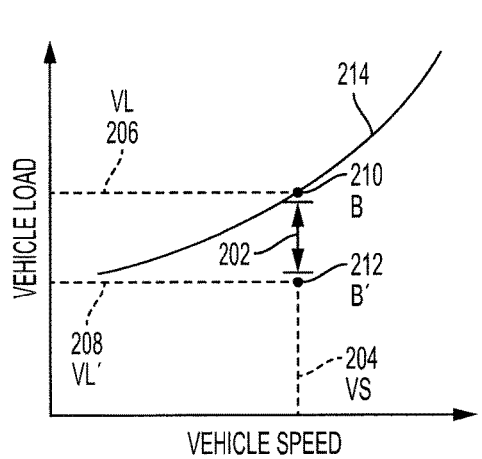
FIG. 2A illustrates a graph of vehicle load versus vehicle speed, according to an embodiment of the invention.

FIG. 2A is a graph of vehicle load versus vehicle speed. In order to move in a forward direction, the vehicle 100 produces driving power to overcome the vehicle load. Vehicle load includes aerodynamic loading, as described herein. The line 214 represents an expected vehicle load based on a given vehicle speed. For example, when the vehicle speed is VS (204), the expected vehicle load is VL (206). Point B (210) corresponds to the vehicle driving power used to overcome vehicle load at vehicle speed VS (204).

When the vehicle 100 is in a drafting condition, the vehicle speed VS (204) remains the same, but the vehicle load may be reduced to VL' (208). Accordingly, the vehicle driving power B' used to overcome the vehicle load VL' is reduced. The gap 202 represents the difference between the expected driving power demand B (210) and the detected driving power demand B' (212). Line 214 may be the expected vehicle load for a particular vehicle slope, and other lines may correspond to different vehicle slopes.

Figure 2B:
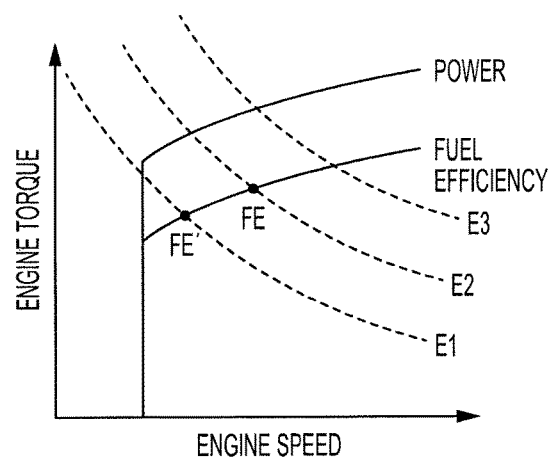
FIG. 2B illustrates a graph of engine torque versus engine speed, according to an embodiment of the invention.

FIG. 2B illustrates engine torque versus engine speed. Also illustrated are curves for engine power, fuel efficiency, and energy values E1, E2, and E3. Fuel efficiency FE represents the fuel efficiency of vehicle 100 in a non-drafting condition (e.g., as shown in FIGS. 1A-1C) and fuel efficiency FE' represents the fuel efficiency of vehicle 100 in a drafting condition (e.g., as shown in FIGS. 1D-1E). As engine speed and engine torque are reduced in the drafting condition, fuel efficiency is improved when moving from FE to FE'. The energy E2 used by the vehicle in the non-drafting condition is greater than the energy E1 used by the vehicle in the drafting condition, further illustrating the gain in fuel efficiency.

Figure 2C:
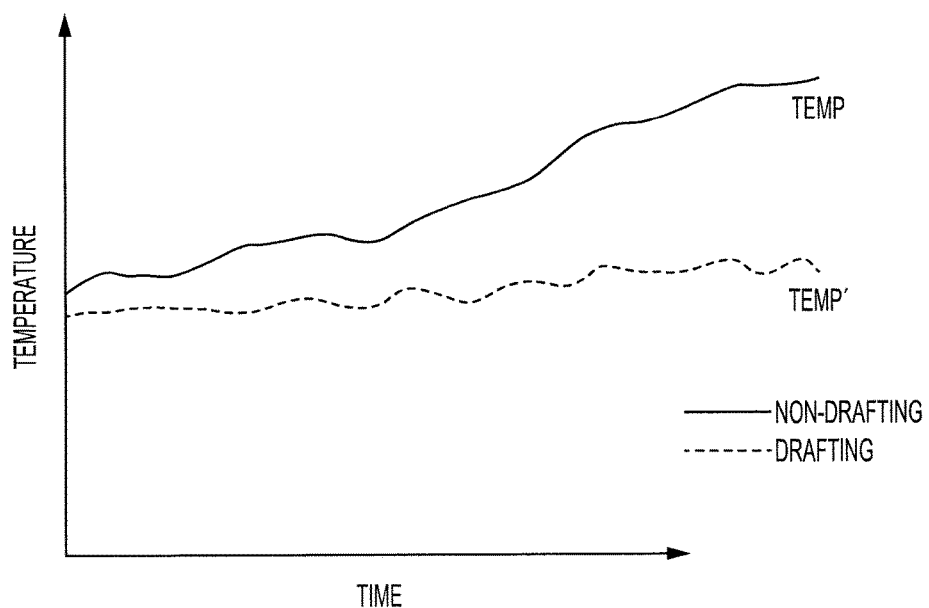
FIG. 2C illustrates a graph of temperature versus time for a vehicle in a non-drafting condition and the vehicle in a drafting condition, according to an embodiment of the invention.

FIG. 2C illustrates engine temperature versus time of operation of vehicle 100. In a non-drafting condition, the engine temperature is greater over time than the engine temperature in a drafting condition, as the engine does not have to output as much engine power in the drafting condition. Over time, the difference between engine temperature in the non-drafting condition and the drafting condition increases.

Figure 3:
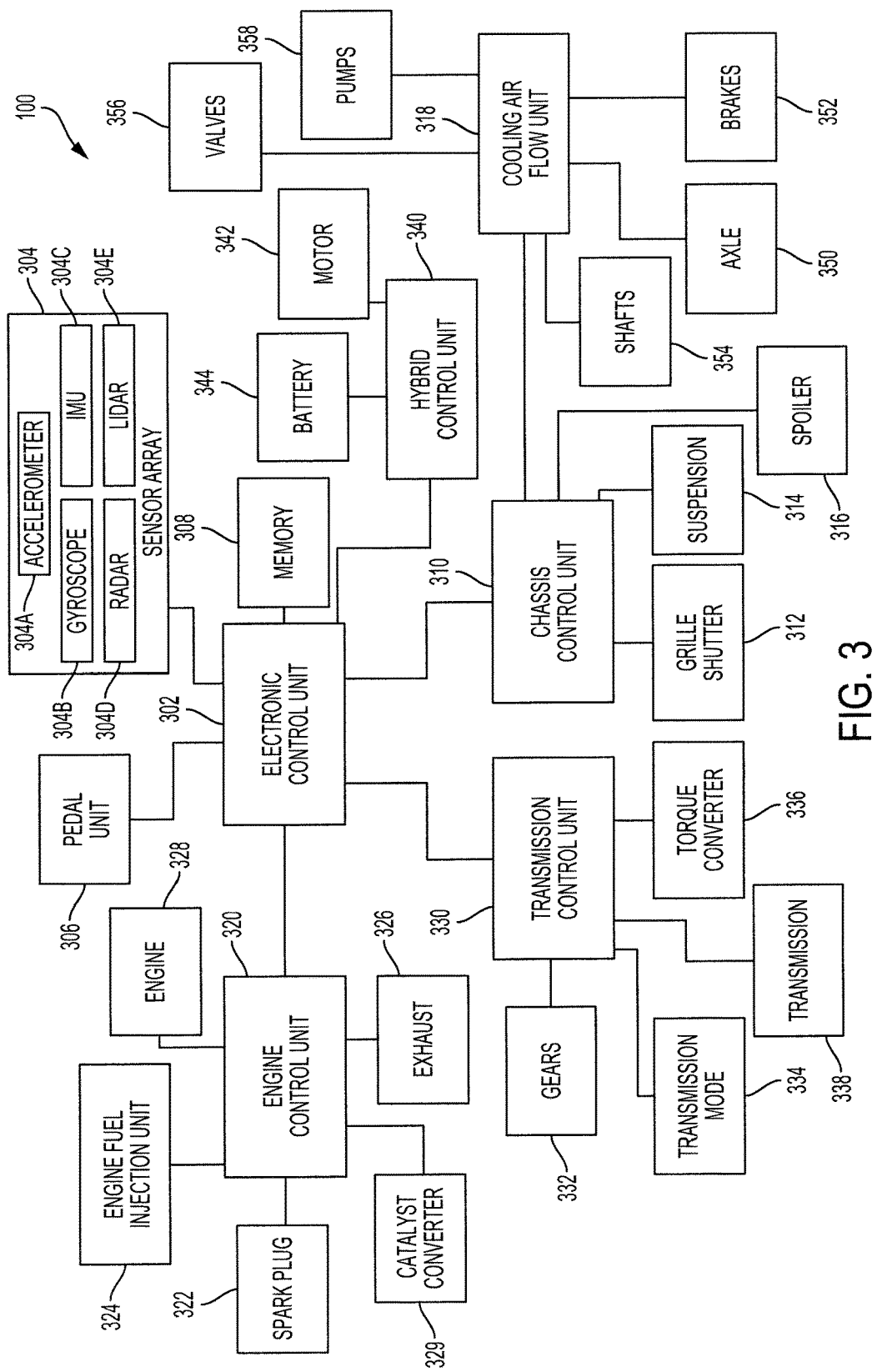
FIG. 3 illustrates a block diagram of the vehicle, according to an embodiment of the invention.

FIG. 3 illustrates a block diagram of a drafting detection and vehicle operation optimization system. The vehicle 100 includes, for example, an electronic control unit (ECU) 302. The ECU 302 is connected to a sensor array 304, a pedal unit 306, a memory 308, a chassis control unit 310, an engine control unit 320, a transmission control unit 330, and a hybrid control unit 340. The various elements of the vehicle 100 may communicate with each other directly or via a communications bus, such as a CAN bus. The chassis control unit 310, the engine control unit 320, the transmission control unit 330, and the hybrid control unit 340 may be used to adjust and maintain vehicle settings. Adjustment of one or more vehicle settings may result in improved efficiency or performance of operations of the vehicle 100.

The sensor array 304 may include one or more sensors configured to detect vehicle data. The sensor array 304 may include an accelerometer 304A configured to detect vehicle speed data. The sensor array 304 may include a gyroscope 304B or an inertial measurement unit (IMU) 304C configured to detect vehicle slope data, indicating an orientation of the vehicle 100. The sensor array 304 may also include one or more proximity sensors configured to detect spatial data of objects in the proximity of the vehicle 100. For example, the sensor array 304 may include a radar 304D or LIDAR 304E sensor configured to determine a proximity of a lead vehicle in front of the vehicle 100. The one or more proximity sensors may be used to verify the detection of the drafting condition by detecting a proximity of the lead vehicle ahead of vehicle 100.

The pedal unit 306 may be configured to receive a pedal input from a driver and detect pedal position data, indicating the engagement of the pedal. The pedal unit 306 may include an accelerator pedal 102 and may also include a brake pedal and a clutch pedal. The pedal position data may be expressed as a value indicating a level of engagement, such as 10 for fully engaged and 0 for non-engaged. The pedal position data may be expressed as a percentage of engagement of the pedal, such as 100% for fully engaged and 0% for non-engaged.

The ECU 302 may receive the pedal position data from the pedal unit 306 and communicate various requests to other elements of the vehicle 100, such as communicating a request for increased engine power to the engine control unit 320, or a request to shift gears to the transmission control unit 330.

The memory 308 may be configured to store data associated with expected driving power demand based on a current vehicle speed and a current vehicle slope. The expected driving power demand data may be stored as a table, a graph, or a formula. The memory 308 may also be configured to store the demand difference percentage threshold and the demand difference time threshold values, as described herein.

Figure 4A:
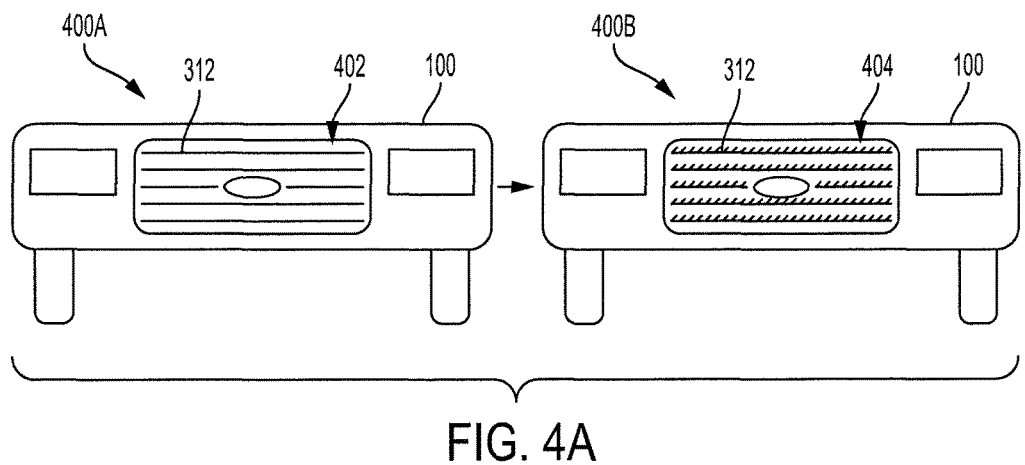
FIG. 4A illustrates a grille shutter adjustment when the drafting condition is detected, according to an embodiment of the invention.

The chassis control unit 310 may be configured to control physical aspects of vehicle 100. The chassis control unit 310 may be connected to a grille shutter 312 and may be configured to adjust openness of an aperture allowing air into the vehicle 100. FIG. 4A illustrates the grille shutter 312 adjustment. In a first situation 400A (e.g., non-drafting condition), the grille shutters 312 are in an open configuration 402. In a second situation 400B (e.g., a drafting condition), the grille shutters 312 are in a closed configuration 404. By opening and closing the grille shutters 312 to adjust the openness of the aperture allowing air into the vehicle 100, an amount of air entering the vehicle 100 may be adjusted, as well as the aerodynamic profile of the vehicle 100. When the grille shutters 312 are closed, aerodynamic profile of the vehicle 100 may be improved, leading to improved fuel efficiency. While closing the grille shutters 312 may result in reduced cooling to vehicle components, when the vehicle 100 is in the drafting condition, less cooling may be required by vehicle components, as engine power is also reduced, as shown in FIG. 2C.

Figure 4B:
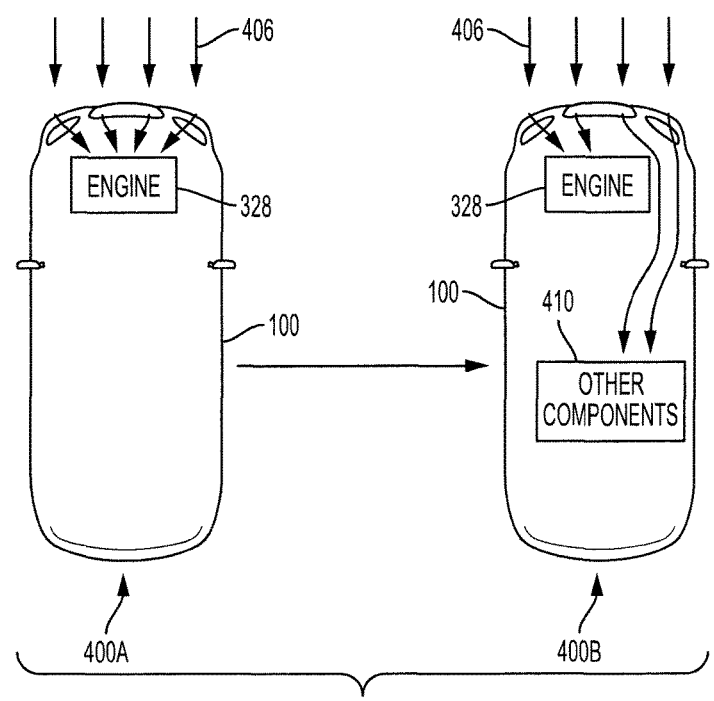
FIG. 4B illustrates a cooling air flow adjustment when the drafting condition is detected, according to an embodiment of the invention.
Figure 4C:
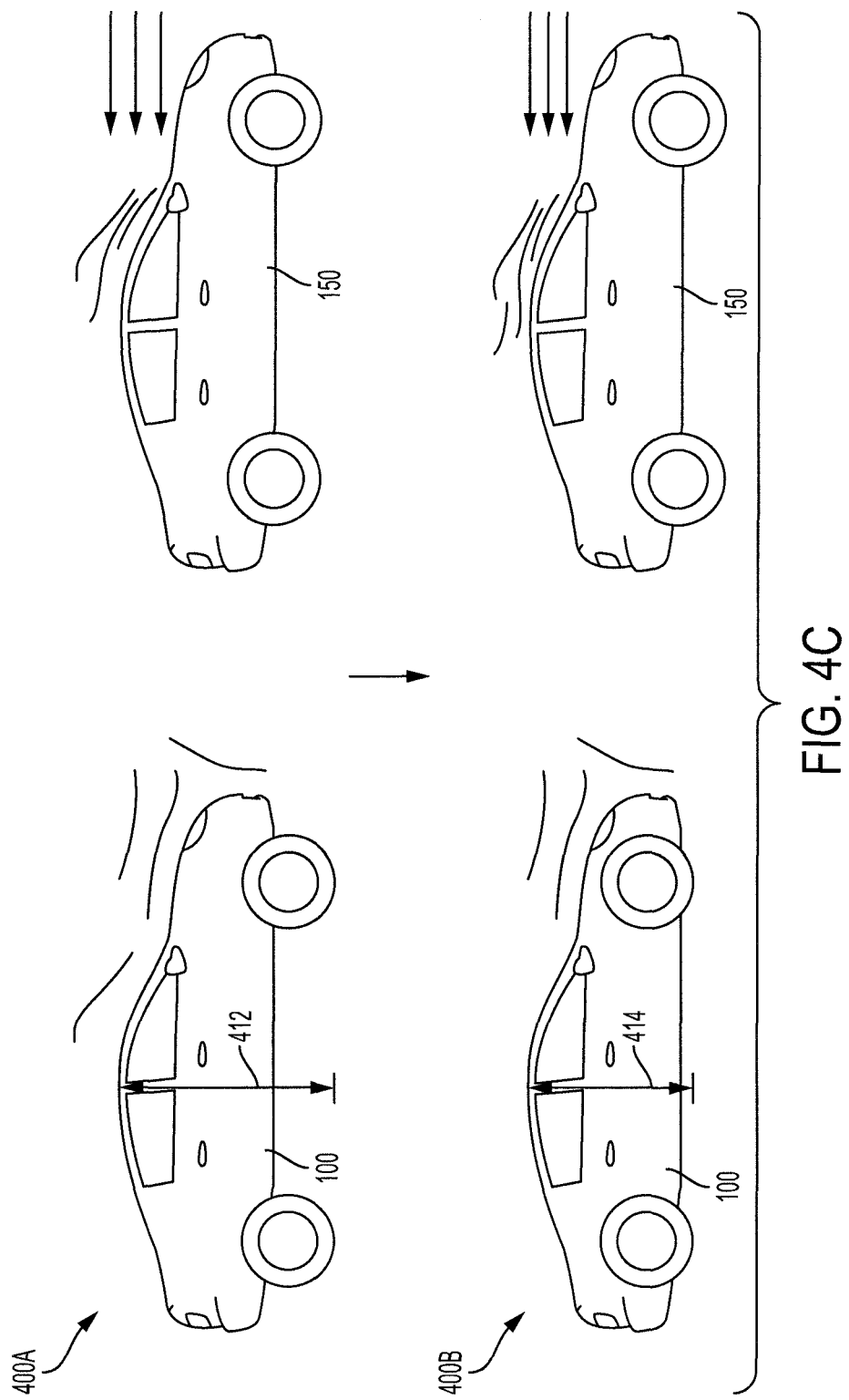
FIG. 4C illustrates a suspension adjustment when the drafting condition is detected, according to an embodiment of the invention.

The chassis control unit 310 may also be connected to an electronically controllable vehicle suspension 314. FIG. 4C illustrates the vehicle suspension 314 adjustment. In a first situation 400A (e.g., the non-drafting condition), the vehicle ride height is a first height 412. The vehicle ride height may be lowered in a second situation 400B (e.g., the drafting condition) to a second height 414 to further improve aerodynamic load reduction.

Figure 4D:
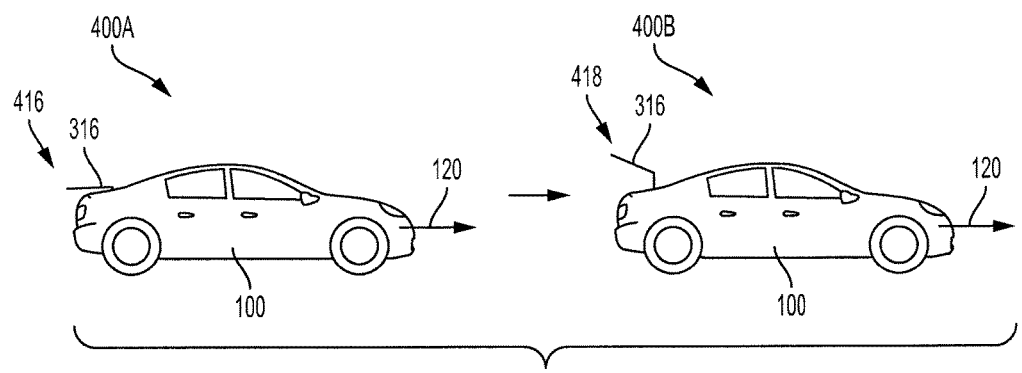
FIG. 4D illustrates a spoiler adjustment when the drafting condition is detected, according to an embodiment of the invention.

The chassis control unit 310 may also be connected to a spoiler 316. FIG. 4D illustrates the spoiler 316 adjustment. In a first situation 400A (e.g., the non-drafting condition), the spoiler 316 is in a retracted position 416. The spoiler may be extended in a second situation 400B (e.g., the drafting condition) to a deployed position 418 to improve downforce on the vehicle and improve handling and/or traction of the vehicle. The spoiler may be raised to a position which returns aerodynamic load to match the non-drafting condition with improved handling as the benefit.

The chassis control unit 310 may also be connected to a cooling air flow unit 318. The cooling air flow unit 318 may be configured to adjust the flow of cooling air 406 entering the vehicle 100. The cooling air 406 may enter the vehicle 100 via the aperture managed by the grille shutters 312. FIG. 4B illustrates cooling air flow adjustment. In a first situation 400A (e.g., the non-drafting condition), the cooling air 406 enters the vehicle 100. A significant portion of the cooling air 406 may be directed to the engine 408 in order to cool the engine 408. In a second situation 400B (e.g., the drafting condition), the cooling air 406 entering the vehicle 100 may be redirected such that a larger portion of the cooling air 406 is directed to other components 410 of the vehicle 100. As illustrated in FIG. 2C, in a drafting condition, the engine 408 may require less cooling. The other components 410 of the vehicle 100 may include a battery 344 or a motor 342, in the case of a hybrid vehicle, which may be pre-cooled in anticipation of increased use to pass the lead vehicle. The other components 410 of the vehicle 100 may include the axles 350, the brakes 352, the transmission 338, the shafts 354, the valves 356, or the pumps 358, which may become hotter when the vehicle 100 is in operation.

The engine control unit 320 may be configured to control functioning of the engine 328. The engine control unit 320 may be connected to one or more spark plugs 322, and the engine control unit 320 may be configured to delay spark plug ignition timing. A delay in spark plug ignition timing may sacrifice fuel efficiency, but igniting the spark plug at a later time results in higher temperatures. Higher temperatures, in turn, result in a catalyst converter 329 being heated faster. The faster the catalyst converter 329 is warmed up, the faster the engine 328 is warmed up. The faster engine 328 is warmed up, the sooner the engine 328 can reach its most efficient operation.

The engine control unit 320 may also be connected to an engine fuel injection unit 324. When the drafting condition is detected, the engine control unit 320 may increase the air-to-fuel ratio in the combustion chamber during operation of the engine 328, in order to improve fuel efficiency. As the engine power demands are reduced in the drafting condition, less fuel may be consumed during each combustion in the engine 328.

The engine control unit 320 may also be connected to an exhaust system 326. When the drafting condition is detected, the engine control unit 320 may increase recirculation of exhaust gas back into the engine 328 in order to improve emissions. As the engine 328 consumes less fuel when in the drafting condition, greater amounts of the exhaust gas may be recirculated into the engine 328. Exhaust gas includes some amount of unburned gas. By recirculating the exhaust gas back into the engine 328, some of the unburned gas may be used. This may result in increased fuel efficiency.

The transmission control unit 330 may be configured to control functioning of the transmission 338. The transmission control unit 330 may be connected to gears 332, which may be part of the transmission 338. The transmission control unit 330 may be configured to limit shifting of gears 332 when the vehicle 100 is in the drafting condition. For example, when in the drafting condition, the transmission control unit 330 may instruct the gears 332 to remain in the highest gear possible, in order to improve fuel efficiency. The transmission control unit 330 may also be configured to adjust upshifting to an earlier point in order to promote use of higher gears. Use of the highest gear possible improves fuel efficiency.

The transmission control unit 330 may also be connected to a torque converter 336. In a drafting condition, the transmission control unit 330 may be configured to lock the torque converter 336, in order to allow the engine 328 to spin at a lower rotations per minute (RPM) during cruising speeds. The lower RPM operation of the engine 328 may result in improved fuel efficiency. Locking the torque converter 336 also maximizes torque transfer from the engine 328 to the transmission 338.

The transmission control unit 330 may also be configured to adjust the transmission mode 334. In a first situation (e.g., the non-drafting condition), the transmission mode 334 is set to drive while the vehicle 100 is moving. In a second situation (e.g., the drafting condition), the transmission mode 334 may alternate between drive and neutral to improve fuel efficiency. As less driving power is used in the drafting condition, the vehicle 100 may be able to maintain the vehicle speed 120 while in neutral. When the vehicle 100 operates in neutral, the fuel efficiency is increased.

Figure 4E:
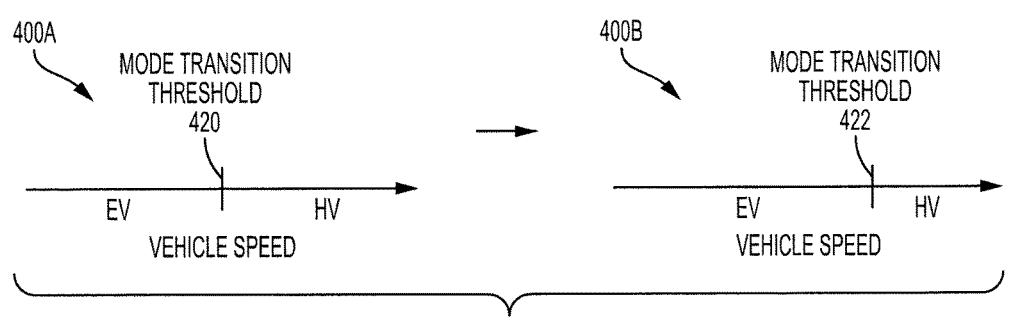
FIG. 4E illustrates a hybrid operation mode threshold adjustment when the drafting condition is detected, according to an embodiment of the invention.

The hybrid control unit 340 may be configured to control hybrid vehicle related functioning. When the vehicle 100 is in the drafting condition, the hybrid control unit 340 may adjust a mode transition threshold. FIG. 4E illustrates the adjustment in mode transition threshold. In a first situation 400A (e.g., the non-drafting condition), the mode transition threshold is at a first threshold 420. When the vehicle 100 reaches the first threshold 420 vehicle speed, the hybrid control unit 340 transitions from the electric vehicle mode to the hybrid vehicle mode and engages use of the engine 328, in addition to, or in lieu of using the motor 342. In a second situation 400B (e.g., the drafting condition), the mode transition threshold is at a second threshold 422, and the vehicle 100 does not transition from the electric vehicle mode to the hybrid vehicle mode until the higher second threshold 422 is met. When in the drafting condition, the vehicle 100 may require less engine power, and therefore the engine does not need to be used until a higher vehicle speed is achieved. The shift in mode transition threshold may improve fuel efficiency, as the battery 344 and the motor 342 are used for a longer period of time.

For example, if the first mode transition threshold 420 is at 25 miles per hour, when the vehicle 100 is in a non-drafting condition, the vehicle 100 uses the motor 342 and battery 344 to power the vehicle 100 when traveling under 25 miles per hour. When the vehicle 100 exceeds 25 miles per hour, the vehicle 100 additionally engages the engine 328. When the vehicle 100 detects a drafting condition, the second mode transition threshold of 30 miles per hour is used, and even when the vehicle 100 is traveling at 28 miles per hour, for example, the motor 342 and the battery 344 are used, and the engine 328 is not used.

Figure 5B:
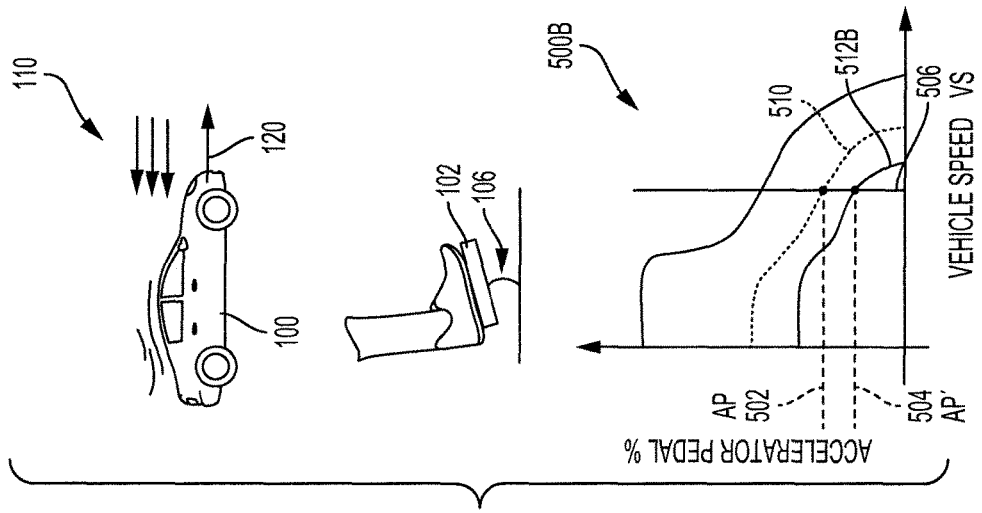
FIG. 5B illustrates an increased power when a change from the drafting condition to a non-drafting condition is detected, according to an embodiment of the invention.
Figure 5A:
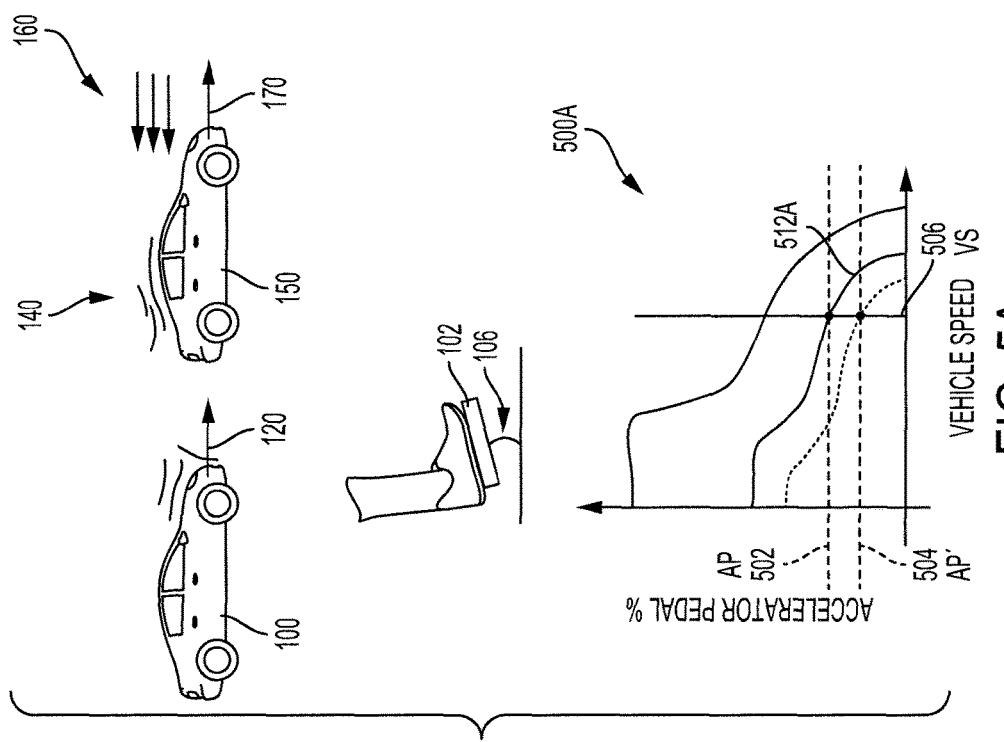
FIG. 5A illustrates the vehicle and accelerator pedal position when in the drafting condition, according to an embodiment of the invention.

FIGS. 5A and 5B illustrate a pedal augmentation for a vehicle in a drafting condition. In many situations, the drafting condition may be a temporary condition, which is frequently interrupted and resumed. The drafting condition may be interrupted when the lead vehicle 150 changes lanes, the vehicle 100 passes lead vehicle 150, or a third vehicle positions itself between vehicle 100 and lead vehicle 150, for example. The drafting condition may be resumed, for example, when the vehicle 100 re-establishes a drafting position behind the lead vehicle 150 or another vehicle. When the drafting condition is interrupted, the driver of vehicle 100 may adjust pedal position in order to maintain the vehicle speed. However, rapid and excessive acceleration may result in particularly inefficient fuel consumption, and may negate fuel efficiency gains previously realized by the system. To prevent excessive and inefficient acceleration from the driver, driving power may be temporarily increased when the drafting condition is interrupted, such that the driver may maintain the same accelerator pedal position and still maintain the same vehicle speed.

FIG. 5A illustrates a vehicle 100 in a drafting condition behind a lead vehicle 150. The lead vehicle 150 is disrupting airflow, and the aerodynamic loading 160 experienced by the lead vehicle 150 is greater than the aerodynamic loading 140 experienced by the vehicle 100. The vehicle 100 is traveling at a vehicle speed 120 and the lead vehicle 150 is traveling at a vehicle speed 170. The two vehicle speeds 120 and 170 may be similar, in order to maintain the drafting condition.

FIG. 5B illustrates the vehicle 100 in a non-drafting condition at a later time. The lead vehicle 150 may have changed lanes or may have sped up significantly while vehicle 100 maintained the same vehicle speed 120. The vehicle 100 is no longer in the drafting condition. Accordingly, the vehicle 100 experiences increased aerodynamic loading, from a reduced aerodynamic loading 140 to a standard aerodynamic loading 110 for the given vehicle speed and vehicle slope.

When the lead vehicle 150 ceases to provide the drafting condition for the vehicle 100, the vehicle 100 may slow down, or the driver of vehicle 100 may engage the accelerator pedal 102 further. However, the driver may over-engage the accelerator pedal 102, resulting in fuel efficiency losses from overconsumption of fuel. The driver may also under-engage the accelerator pedal 102, resulting in a slowing down of the vehicle 100. Slowing down of the vehicle 100 may cause other vehicles to slow down, and in some situations, may eventually contribute to traffic congestion.

Graph 500A illustrates the vehicle 100 accelerator pedal position versus vehicle speed, for a given vehicle slope. The greater the accelerator pedal position, the more it is engaged or depressed. In some embodiments, the data points and associated curve formed therewith in graphs 500A and 500B may correspond to a drive force map, indicating an accelerator pedal position for a given vehicle speed. Curve 512A represents the drive force map for the vehicle 100. At vehicle speed VS 506 (e.g., vehicle speed 120), an expected accelerator pedal position is AP 502. However, due to the drafting condition, the detected accelerator pedal position is AP' 504.

When the vehicle 100 transitions from the drafting condition (as shown in graph 500A) to the non-drafting condition (as shown in graph 500B), the accelerator pedal remains at AP' 504. If the accelerator pedal 102 remained at AP' 504 after the drafting condition is removed, the vehicle 100 would slow down. The drive force map for the vehicle 100 when the vehicle is in the non-drafting condition is represented by curve 512B.

The vehicle 100 may detect the transition from the drafting condition to the non-drafting condition when the expected driving power demand does not exceed the detected driving power demand. The augmented drive force map is shown in graph 500B, represented as dashed line 510. Also shown in FIG. 5B is the accelerator pedal 102 remaining in the same accelerator pedal position 106 as in the drafting condition, and the vehicle 100 has the same vehicle speed 102 as in the drafting condition.

By using the augmented drive force map 510, the pedal position AP' 504 is augmented to AP 502, resulting in vehicle speed 120 being maintained when the drafting condition is removed. AP 502 in FIG. 5B is not an actual pedal position, and instead an effective pedal position.

Over time, the augmented drive force map 510 may be moved back to the baseline drive force map 512B, as maintaining the augmented drive force map 510 may distort the driver's expectations of responsiveness and feel. By augmenting the drive force map to take changes in drafting condition into consideration, the driver may experience a smoother drive, as the accelerator pedal may not be engaged and disengaged as frequently when transitioning between the drafting condition and the non-drafting condition.

Figure 6:
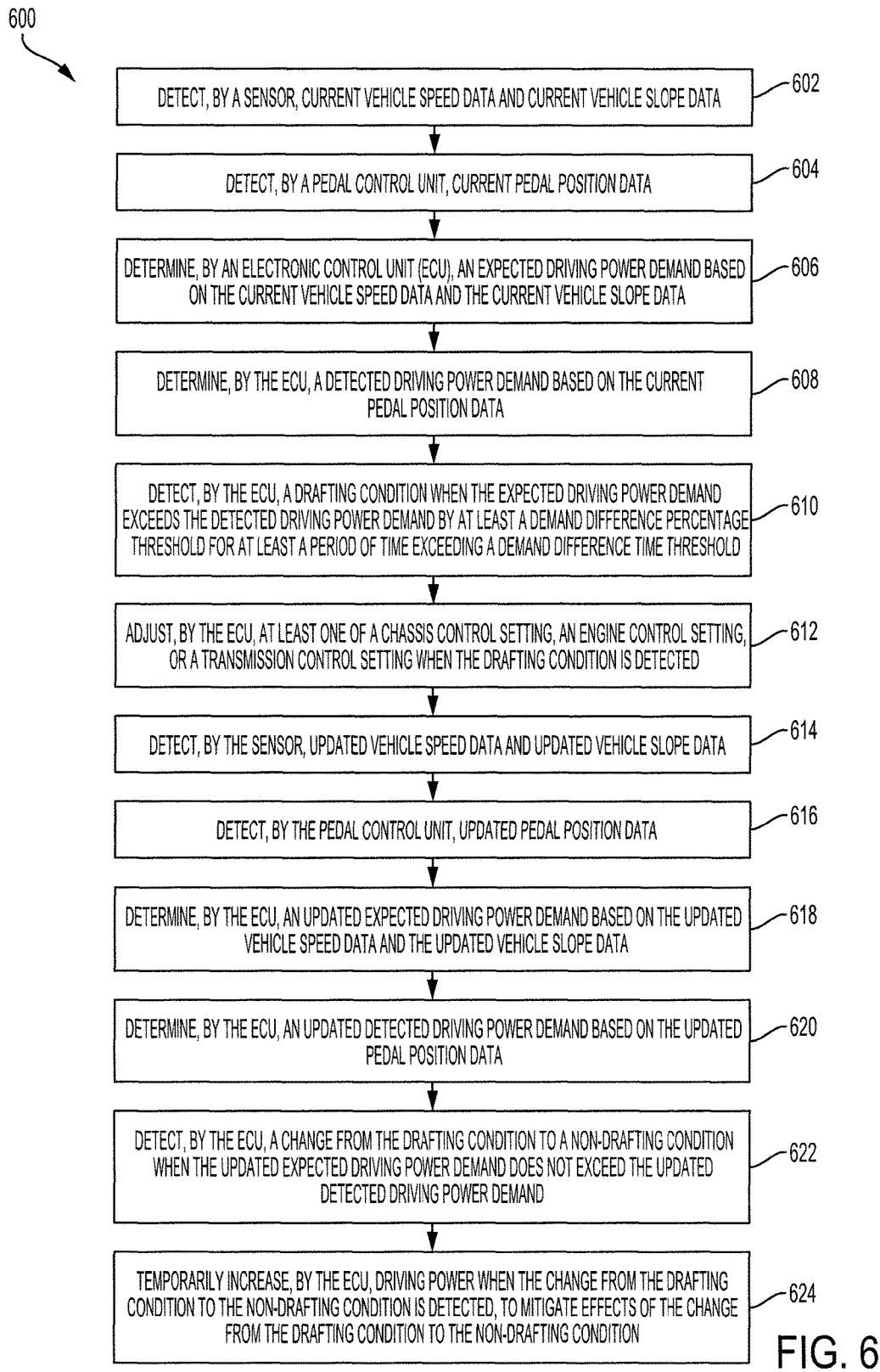
FIG. 6 illustrates an example of a flowchart describing a drafting detection and optimization system, according to an embodiment of the invention.

FIG. 6 illustrates a flowchart of a method of operation of the drafting detection and optimization system, according to an embodiment of the invention. The method 600 shown in FIG. 6 may be used by a vehicle 100 as described herein.

A sensor from the sensor array 304 detects current vehicle speed data and current vehicle slope data of a vehicle 100 (step 602). The current vehicle speed data may indicate the current velocity of the vehicle 100 and the current vehicle slope data may indicate the current incline or decline of the vehicle 100. The sensor from the sensor array 304 may be one or more of an accelerometer, a gyroscope, or an inertial measurement unit, for example. The vehicle speed data may be in terms of distance per time, such as miles per hour or meters per second. The vehicle slope data may be in terms of an angle of incline or decline, such as a pitch angle.

A pedal control unit 306 detects current pedal position data (step 604). The pedal position data may indicate an amount of engagement or depression of the accelerator pedal 102. The pedal position data may be a value or a percentage of engagement of the accelerator pedal 102.

The electronic control unit (ECU) 302 determines an expected driving power demand based on the current vehicle speed data and the current vehicle slope data (step 606). The expected driving power demand may be determined by the ECU 302 using expected driving power demand data stored in memory 308. The expected driving power demand data may be a chart, table, or formula, providing driving power demand corresponding to a given pedal position.

The ECU 302 determines a detected driving power demand based on the current pedal position data (step 608). The detected driving power demand represents an amount of driving power used to overcome the loading forces on the vehicle, such as aerodynamic loading.

The ECU 302 detects a drafting condition when the expected driving power demand exceeds the detected driving power demand by at least a demand difference percentage threshold for at least a period of time exceeding a demand difference time threshold (step 610). As described herein, in a drafting condition, the detected driving power demand may be less than the expected driving power demand, as the aerodynamic loading on the vehicle 100 is reduced.

In order to detect a stable drafting condition, the ECU 302 may not detect the drafting condition unless the expected driving power demand exceeds the detected driving power demand by at least a demand difference percentage threshold. That is, when the expected driving power demand exceeds the detected driving power demand by a trivial amount, a reliable and/or actual drafting condition may not be present. For example, a cross-wind or momentary tail wind may result in a minor difference between expected driving power demand and detected driving power demand. In either situation, a drafting condition is not present. The demand difference percentage threshold may be stored in memory 308, and may be adjusted based on the location of the vehicle, the vehicle speed, the user preferences, or the manufacturer preferences. The demand difference percentage threshold may be determined by dividing the difference between the expected driving power demand and the detected driving power demand by the expected driving power demand.

In order to further detect a stable drafting condition, the ECU 302 may not detect the drafting condition until the expected driving power demand exceeds the detected driving power demand for at least a period of time exceeding a demand difference time threshold. That is, when the expected driving power demand exceeds the detected driving power demand only briefly, a reliable and/or actual drafting condition may not be present. For example, a lead vehicle 150 providing a drafting condition may move lanes shortly after providing the drafting condition, resulting in an unreliable, temporary drafting condition. The demand difference time threshold may be stored in the memory 308, and may be adjusted based on the location of the vehicle, the vehicle speed, the user preferences, or the manufacturer preferences. The ECU 302 may detect whether the expected driving power demand exceeds the detected driving power demand for at least a period of time exceeding a demand difference time threshold by starting a timer when the expected driving power demand exceeds the detected driving power demand or when the expected driving power demand exceeds the detected driving power demand by the demand difference percentage threshold, and detecting when the timer has exceeded the demand difference time threshold.

The ECU 302 adjusts (e.g., increases or decreases) or sets at least one of a chassis control setting, an engine control setting, a transmission control setting, or a hybrid control setting, when the drafting condition is detected (step 612).

The ECU 302 adjusts a chassis control setting by communicating an instruction to the chassis control unit 310. The chassis control unit 310 receives, from the ECU 302, the instruction and adjusts one or more chassis control settings. As described herein, the chassis control settings that may be adjusted when the vehicle 100 is in the drafting condition include adjusting grille shutters 312 to improve vehicle aerodynamics, adjusting cooling air flow from a vehicle engine to other vehicle components using a cooling air flow unit 318, adjusting suspension 314 to adjust vehicle height to improve vehicle aerodynamics, or adjusting vehicle spoiler 316 position to improve vehicle aerodynamics.

The ECU 302 adjusts an engine control setting by communicating an instruction to the engine control unit 320. The engine control unit 320 receives, from the ECU 302, the instruction and adjusts one or more engine control settings. As described herein, the engine control settings that may be adjusted when the vehicle 100 is in the drafting condition include adjusting spark plug 322 ignition timing to increase fuel efficiency, adjusting air-to-fuel ratio using an engine fuel injection unit 324 to increase fuel efficiency, adjusting exhaust gas recirculation from exhaust 326 to improve vehicle emissions.

The ECU 302 adjusts a transmission control setting by communicating an instruction to the transmission control unit 330. The transmission control unit 330 receives, from the ECU 302, the instruction and adjusts one or more transmission control settings. As described herein, the transmission control settings that may be adjusted when the vehicle 100 is in the drafting condition include adjusting shift controls of the gear box 332 to increase fuel efficiency, locking a torque converter 336 to increase fuel efficiency, or adjusting a transmission mode 334 to increase fuel efficiency.

The ECU 302 adjusts a hybrid control setting by communicating an instruction to the hybrid control unit 340. The hybrid control unit 340 receives, from the ECU 302, the instruction and adjusts one or more hybrid control settings. As described herein, the hybrid control settings that may be adjusted when the vehicle 100 is in the drafting condition include adjusting a hybrid mode transition threshold to increase use of an electric operation mode to increase fuel efficiency. When in the drafting condition, the vehicle 100 may remain in electric mode for a longer time, as less driving power is demanded.

The sensor from the sensor array 304 detects updated vehicle speed data and updated vehicle slope data of a vehicle 100 (step 614). The pedal control unit 306 detects updated pedal position data (step 616). The electronic control unit (ECU) 302 determines an updated expected driving power demand based on the updated vehicle speed data and the updated vehicle slope data (step 618). The ECU 302 determines an updated detected driving power demand based on the updated pedal position data (step 620).

The ECU 302 detects a change from the drafting condition to a non-drafting condition when the updated expected driving power demand does not exceed the updated detected driving power demand (step 622).

The ECU 302 temporarily increases the driving power when the change from the drafting condition to the non-drafting condition is detected, to mitigate the effects of the change from the drafting condition to the non-drafting condition, as described herein (step 624). The ECU 302 may temporarily increase driving power by augmenting the drive force map associated with the acceleration pedal 102. When the vehicle 100 is no longer in the drafting condition, for a predetermined period of time, a given accelerator pedal position results in more driving power than usual. By augmenting the driving power for the given accelerator pedal position, ride feel may be improved. Without the temporary augmenting of the driving power, the driver may experience either a slowing down of the vehicle 100 despite maintaining the same accelerator pedal position, or the driver may adjust accelerator pedal position in response to the change from the drafting condition to the non-drafting condition.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that the scope shall not be restricted, except in light of the appended claims and their equivalents.

What is claimed is:

1. A system for improving a performance or an efficiency of operation of a vehicle experiencing reduced aerodynamic loading due to driving behind a lead vehicle, the system comprising:
   a first sensor configured to detect current vehicle speed data;
   a second sensor configured to detect current vehicle slope data;
   a third sensor configured to detect spatial data indicating distance to the lead vehicle;
   a pedal control unit configured to detect current pedal position data; and
   an electronic control unit (ECU) configured to:
      determine an expected driving power demand based on the current vehicle speed data and the current vehicle slope data,
      determine a detected driving power demand based on the current pedal position data,
      detect a drafting condition when the expected driving power demand exceeds the detected driving power demand and when the spatial data indicates the vehicle is within a proximity of the lead vehicle, and
      adjust, when the drafting condition is detected, at least one of a chassis control setting, an engine control setting, a transmission control setting, or a hybrid control setting to improve the performance or the efficiency of operation of the vehicle.

2. The system of claim 1, wherein the drafting condition is detected when the expected driving power demand exceeds the detected driving power demand by a demand difference percentage threshold.

3. The system of claim 2, wherein the drafting condition is determined when the expected driving power demand exceeds the detected driving power demand for a period of time exceeding a demand difference time threshold.

4. The system of claim 1, wherein adjusting the chassis control setting includes at least one of adjusting grille shutters to improve vehicle aerodynamics to improve the performance or the efficiency of operation of the vehicle, adjusting cooling air flow from a vehicle engine to one or more other vehicle components to improve the performance or the efficiency of operation of the vehicle, adjusting vehicle height to improve vehicle aerodynamics to improve the performance or the efficiency of operation of the vehicle, or adjusting vehicle spoiler position to improve vehicle aerodynamics to improve the performance or the efficiency of operation of the vehicle.

5. The system of claim 1, wherein adjusting the engine control setting includes at least one of adjusting spark plug ignition timing to increase fuel efficiency to improve the performance or the efficiency of operation of the vehicle, adjusting air-to-fuel ratio to increase fuel efficiency to improve the performance or the efficiency of operation of the vehicle, or adjusting exhaust gas recirculation to improve vehicle emissions to improve the performance or the efficiency of operation of the vehicle.

6. The system of claim 1, wherein adjusting the transmission control setting includes at least one of adjusting shift controls to increase fuel efficiency to improve the performance or the efficiency of operation of the vehicle, locking a torque converter to increase fuel efficiency to improve the performance or the efficiency of operation of the vehicle, or adjusting a transmission mode to increase fuel efficiency to improve the performance or the efficiency of operation of the vehicle.

7. The system of claim 1, wherein adjusting the hybrid control setting includes adjusting a hybrid mode transition threshold to increase use of an electric operation mode to increase fuel efficiency to improve the performance or the efficiency of operation of the vehicle.

8. The system of claim 1, wherein the electronic control unit is further configured to:
determine an updated expected driving power demand based on updated vehicle speed data and updated vehicle slope data;
determine an updated detected driving power demand based on updated pedal position data;
detect a change from the drafting condition to a non-drafting condition when the updated expected driving power demand does not exceed the updated detected driving power demand; and
temporarily increase driving power when the change from the drafting condition to the non-drafting condition is detected, to mitigate effects of increased aerodynamic loading caused by the change from the drafting condition to the non-drafting condition.

9. A vehicle comprising:
a first sensor configured to detect current vehicle speed data;
a second sensor configured to detect current vehicle slope data;
a third sensor configured to detect spatial data indicating distance to a lead vehicle; and
an electronic control unit (ECU) configured to:
determine an expected driving power demand based on the current vehicle speed data and the current vehicle slope data,
determine a current driving power demand,
detect a drafting condition when the expected driving power demand exceeds the current driving power demand and when the spatial data indicates the vehicle is within a proximity of the lead vehicle, and
adjust, when the drafting condition is detected, at least one of a chassis control setting, an engine control setting, a transmission control setting, or a hybrid control setting.

10. The vehicle of claim 9, wherein the current driving power demand is determined based on an autonomous driving protocol for controlling the vehicle.

11. The vehicle of claim 9, wherein the current driving power demand is determined based on current pedal position data detected by a pedal control unit.

12. The vehicle of claim 9, wherein the drafting condition is detected when the expected driving power demand exceeds the detected driving power demand by a demand difference percentage threshold for a period of time exceeding a demand difference time threshold.

13. The vehicle of claim 9, wherein adjusting the chassis control setting includes at least one of adjusting grille shutters to improve vehicle aerodynamics, adjusting cooling air flow from a vehicle engine to one or more other vehicle components, adjusting vehicle height to improve vehicle aerodynamics, or adjusting vehicle spoiler position to improve vehicle aerodynamics.

14. The vehicle of claim 9, wherein adjusting the engine control setting includes at least one of adjusting spark plug ignition timing to increase fuel efficiency, adjusting air-to-fuel ratio to increase fuel efficiency, or adjusting exhaust gas recirculation to improve vehicle emissions.

15. The vehicle of claim 9, wherein adjusting the transmission control setting includes at least one of adjusting shift controls to increase fuel efficiency, locking a torque converter to increase fuel efficiency, or adjusting a transmission mode to increase fuel efficiency.

16. The vehicle of claim 9, wherein adjusting the hybrid control setting includes adjusting a hybrid mode transition threshold to increase use of an electric operation mode to increase fuel efficiency.

17. A method for improving a performance or an efficiency of operation of a vehicle experiencing reduced aerodynamic loading due to driving behind a lead vehicle, the method comprising:
detecting, by a first sensor, current vehicle speed data;
detecting, by a second sensor, current vehicle slope data;
detecting, by a third sensor, spatial data indicating distance to the lead vehicle;
detecting, by a pedal control unit, current pedal position data;
determining, by an electronic control unit (ECU), an expected driving power demand based on the current vehicle speed data and the current vehicle slope data;
determining, by the ECU, a detected driving power demand based on the current pedal position data;
detecting, by the ECU, a drafting condition when the expected driving power demand exceeds the detected driving power demand by a demand difference percentage threshold for a period of time exceeding a demand difference time threshold and when the spatial data indicates the vehicle is within a proximity of the lead vehicle; and
adjusting, by the ECU, when the drafting condition is detected, at least one of a chassis control setting, an engine control setting, a transmission control setting, or a hybrid control setting to improve the performance or the efficiency of operation of the vehicle.

18. The method of claim 17, wherein adjusting the chassis control setting includes at least one of adjusting grille shutters to improve vehicle aerodynamics to improve the performance or the efficiency of operation of the vehicle, adjusting cooling air flow from a vehicle engine to one or more other vehicle components to improve the performance or the efficiency of operation of the vehicle, adjusting vehicle height to improve vehicle aerodynamics to improve the performance or the efficiency of operation of the vehicle, or adjusting vehicle spoiler position to improve vehicle aerodynamics to improve the performance or the efficiency of operation of the vehicle.

19. The method of claim 17, wherein adjusting the engine control setting includes at least one of adjusting spark plug ignition timing to increase fuel efficiency to improve the performance or the efficiency of operation of the vehicle, adjusting air-to-fuel ratio to increase fuel efficiency to improve the performance or the efficiency of operation of the vehicle, or adjusting exhaust gas recirculation to improve vehicle emissions to improve the performance or the efficiency of operation of the vehicle, wherein adjusting the transmission control setting includes at least one of adjusting shift controls to increase fuel efficiency to improve the performance or the efficiency of operation of the vehicle, locking a torque converter to increase fuel efficiency to improve the performance or the efficiency of operation of the vehicle, or adjusting a transmission mode to increase fuel efficiency to improve the performance or the efficiency of operation of the vehicle, and wherein adjusting the hybrid control setting includes adjusting a hybrid mode transition threshold to increase use of an electric operation mode to increase fuel efficiency to improve the performance or the efficiency of operation of the vehicle.

20. The method of claim 17, wherein the method further comprises:

determining, by the ECU, an updated expected driving power demand based on updated vehicle speed data and updated vehicle slope data;

determining, by the ECU, an updated detected driving power demand based on updated pedal position data;

detecting, by the ECU, a change from the drafting condition to a non-drafting condition when the updated expected driving power demand does not exceed the updated detected driving power demand; and temporarily increasing, by the ECU, driving power when the change from the drafting condition to the non-drafting condition is detected, to mitigate effects of increased aerodynamic loading caused by the change from the drafting condition to the non-drafting condition.

\* \* \* \* \*